(12) United States Patent
Söhnholz

(10) Patent No.: US 10,516,847 B2
(45) Date of Patent: Dec. 24, 2019

(54) WIRELESS CAMERA RECEIVER AND ACCUMULATOR FOR A WIRELESS CAMERA RECEIVER

(71) Applicant: Sennheiser electronic GmbH & Co. KG, Wedemark (DE)

(72) Inventor: Gerd Söhnholz, Essel (DE)

(73) Assignee: Sennheiser electronic GmbH & Co. KG, Wedemark (DE)

(*) Notice: Subject to any disclaimer, the term of this patent is extended or adjusted under 35 U.S.C. 154(b) by 2 days.

(21) Appl. No.: 15/502,223

(22) PCT Filed: Sep. 2, 2015

(86) PCT No.: PCT/EP2015/070037
§ 371 (c)(1),
(2) Date: Feb. 7, 2017

(87) PCT Pub. No.: WO2016/034616
PCT Pub. Date: Mar. 10, 2016

(65) Prior Publication Data
US 2017/0324923 A1 Nov. 9, 2017

(30) Foreign Application Priority Data
Sep. 4, 2014 (DE) .................. 10 2014 217 669

(51) Int. Cl.
*H04N 5/60* (2006.01)
*H04N 9/82* (2006.01)
*H04N 5/225* (2006.01)

(52) U.S. Cl.
CPC .......... *H04N 5/602* (2013.01); *H04N 5/225* (2013.01); *H04N 9/8211* (2013.01); *H04N 5/2252* (2013.01)

(58) Field of Classification Search
CPC ...... H04N 5/602; H04N 5/225; H04N 5/2252; H04N 5/60; H04N 5/2251
USPC ..... 348/484, 482, 462, 423.1, 333.06, 211.2, 348/47, 207.99, 231.4, 64, 73, 50, 49, 48; 381/26, 56, 77, 91, 110, 111, 113, 119, 381/122; 320/107, 103, 111, 113;
(Continued)

(56) References Cited

U.S. PATENT DOCUMENTS 6,845,215 B1 * 1/2005 Greenwold ...... G08B 13/19619
386/230
7,473,098 B1 * 1/2009 Poulos ................... H01R 24/30
439/21
(Continued)

FOREIGN PATENT DOCUMENTS

CN 2 481 087 3/2002
CN 101523670 9/2009
(Continued)

OTHER PUBLICATIONS

International Search Report for Application No. PCT/EP2015/070037 dated Nov. 23, 2015.
(Continued)

*Primary Examiner* — Michael E Teitelbaum
(74) *Attorney, Agent, or Firm* — Haug Partners LLP

(57) ABSTRACT

There is provided a wireless camera receiver that includes a housing, a wireless receiving unit for receiving a wirelessly transmitted audio signal, and an XLR connection. The XLR connection is adapted to be rotatable with respect to the housing.

8 Claims, 10 Drawing Sheets

(58) Field of Classification Search
USPC .......... 439/192, 131, 119, 95, 63; 362/183;
445/3.06, 103, 104, 221, 500, 569.1
See application file for complete search history.

(56) References Cited

U.S. PATENT DOCUMENTS

| | | | | |
|---|---|---|---|---|
| 2001/0034214 | A1* | 10/2001 | Koike | H04B 1/04 455/95 |
| 2003/0103770 | A1* | 6/2003 | Arbuckle | F16M 11/10 396/427 |
| 2003/0118196 | A1* | 6/2003 | Woolfork | H04R 1/1091 381/74 |
| 2005/0140812 | A1* | 6/2005 | Yoo | H04B 1/38 348/333.06 |
| 2006/0093348 | A1* | 5/2006 | Squillace | G03B 15/05 396/422 |
| 2007/0003073 | A1* | 1/2007 | Iriarte | G10H 1/0083 381/77 |
| 2007/0242839 | A1* | 10/2007 | Kim | H04R 3/00 381/122 |
| 2008/0010888 | A1* | 1/2008 | Nerheim | F41H 13/0018 42/1.08 |
| 2008/0050650 | A1* | 2/2008 | Hara | H01M 2/1066 429/179 |
| 2008/0095386 | A1* | 4/2008 | Rollins | H04R 1/04 381/113 |
| 2008/0187141 | A1 | 8/2008 | Wang | |
| 2008/0247571 | A1 | 10/2008 | Shiga et al. | |
| 2011/0067082 | A1 | 3/2011 | Walker | |
| 2012/0070705 | A1* | 3/2012 | Kim | H01M 2/043 429/61 |
| 2014/0091765 | A1* | 4/2014 | Law | H02J 7/0042 320/111 |
| 2014/0240966 | A1* | 8/2014 | Garcia | H02J 7/0086 362/183 |

FOREIGN PATENT DOCUMENTS

| | | |
|---|---|---|
| DE | 202 20 067 | 4/2003 |
| DE | 10 2008 059 760 | 6/2010 |
| EP | 1 379 058 | 1/2004 |

OTHER PUBLICATIONS

Chinese First Office Action for application No. 201580047152.X dated Jun. 4, 2019.

* cited by examiner

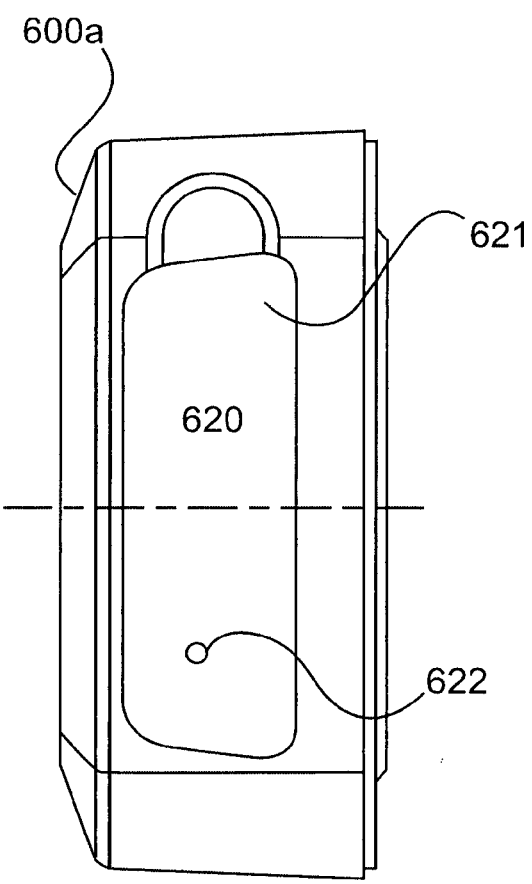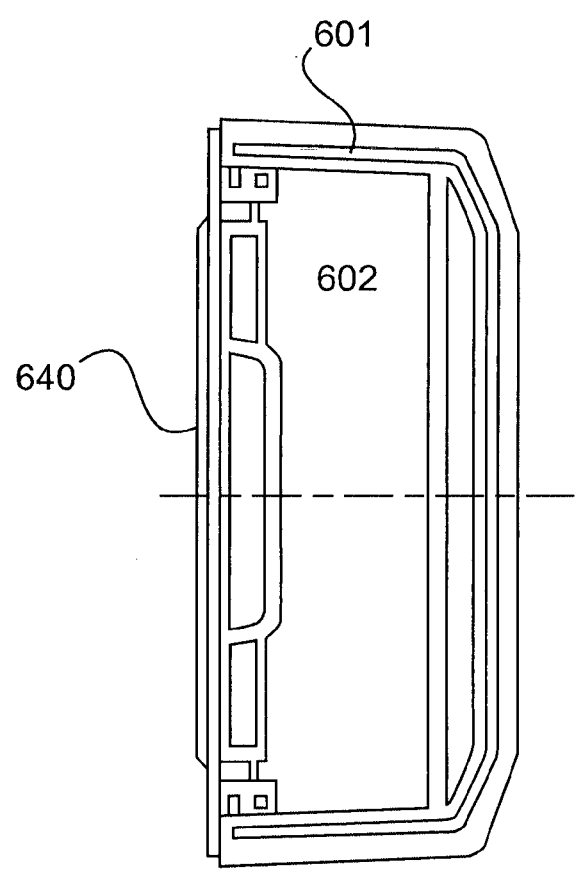
Fig.2D                        Fig.2E

WIRELESS CAMERA RECEIVER AND ACCUMULATOR FOR A WIRELESS CAMERA RECEIVER

The present application claims priority from International Patent Application No. PCT/EP2015/070037, which claims priority from German Patent Application No. 10 2014 217 669.7 filed on Sep. 4, 2014, the disclosures of which are incorporated herein by reference in their entirety.

FIELD OF THE INVENTION

It is noted that citation or identification of any document in this application is not an admission that such document is available as prior art to the present invention.

The present invention concerns a wireless camera receiver and a rechargeable battery for a wireless camera receiver.

Wireless camera receivers are wireless receivers which receive a wireless audio signal from a wireless microphone or another wireless transmitter and convert it into wired audio signals which are then transmitted by way of an interface to a video camera to which the receiver is fitted, so that the video camera can record the video signals recorded thereby together with the wirelessly received audio signals.

On the German patent application from which priority is claimed the German Patent and Trade Mark Office searched the following documents: DE 202 20 067 U1; US 2008/0187141 A1 and EP 1 379 058 A1.

SUMMARY OF THE INVENTION

An object of the present invention is to provide an improved wireless camera receiver.

Thus there is provided a wireless camera receiver comprising a housing, a wireless receiving unit for receiving a wirelessly transmitted audio signal, and an XLR connection. The XLR connection is adapted to be rotatable with respect to the housing.

According to an aspect of the present invention the XLR connection is adapted to be rotatable between 0 and 300 through 340° with respect to the housing.

According to a further aspect of the present invention the camera receiver has six electrical connections for making contact with a rechargeable battery.

According to a further aspect of the present invention the wireless camera receiver has an inside at which there is provided at least one hook for mechanical stabilization of the rechargeable battery.

According to a further aspect of the present invention the wireless camera receiver has a recess for receiving a projection on the rechargeable battery.

The invention also concerns a rechargeable battery unit for a wireless camera receiver. The rechargeable battery unit has an electrical USB charging connection for receiving a USB charging cable, and six electrical connections for making contact with the corresponding connections of the wireless camera receiver, wherein the electrical connections are arranged on an inside of the rechargeable battery.

According to a further aspect of the present invention the rechargeable battery unit has grooves adapted to receive guides of the wireless camera receiver.

BRIEF DESCRIPTION OF THE DRAWINGS

FIGS. 2A-2E show various views of a rechargeable battery unit for a camera receiver according to a first embodiment.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1A:
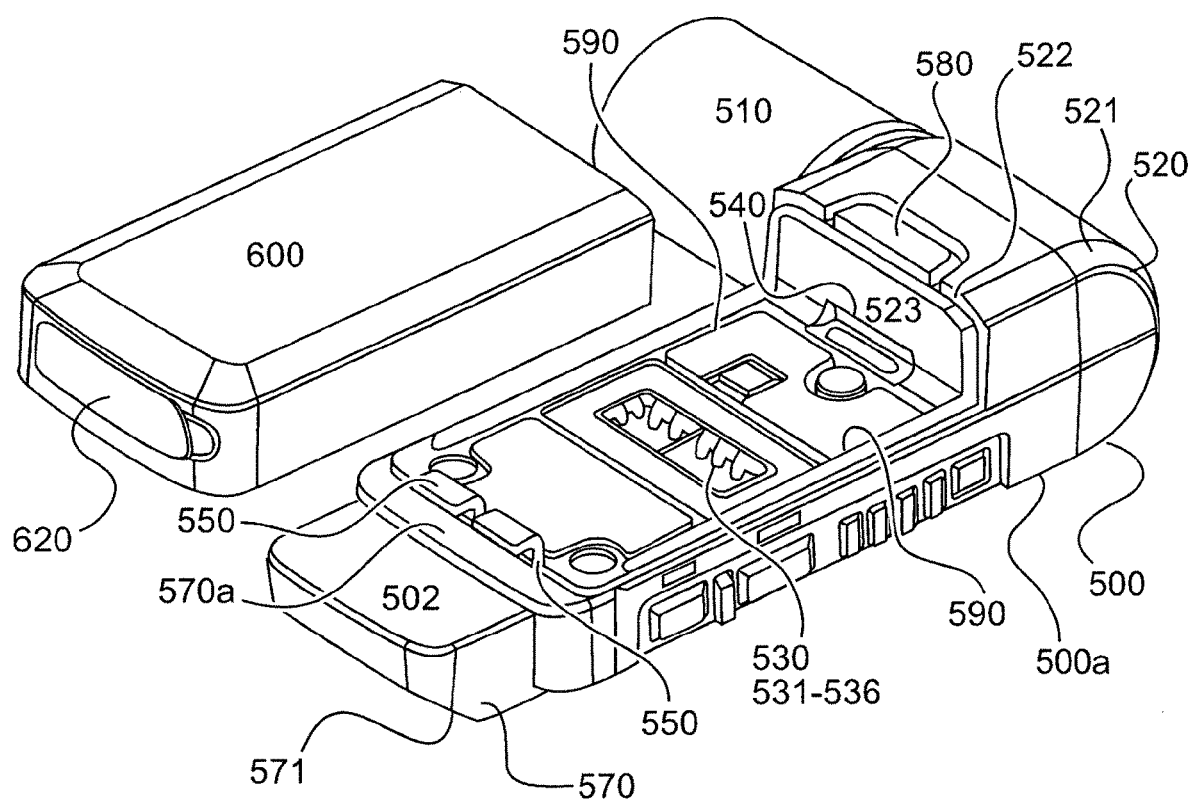
FIGS. 1A-1G show various views of a camera receiver according to a first embodiment.
Figure 1B:
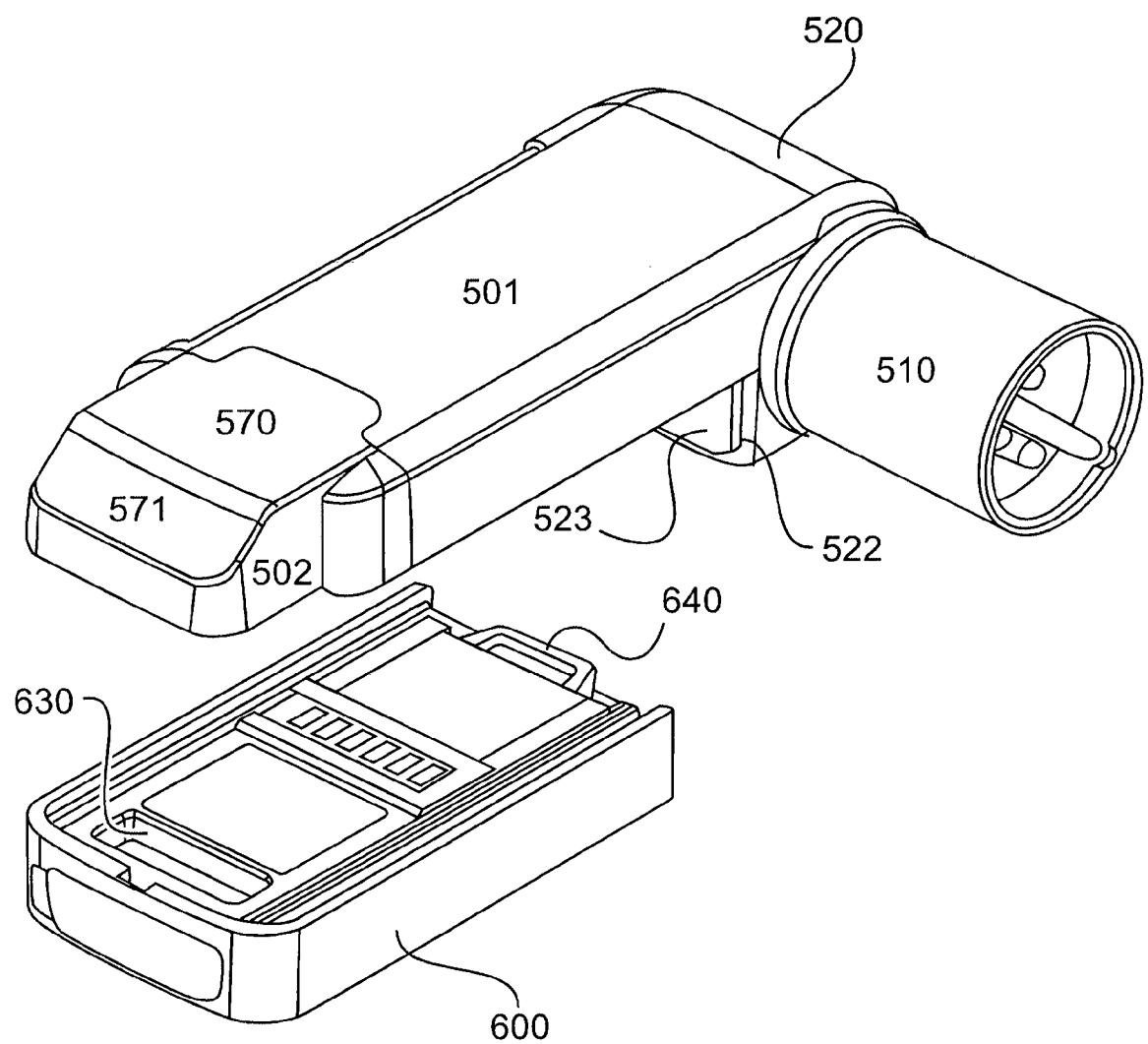
Figure 1C:
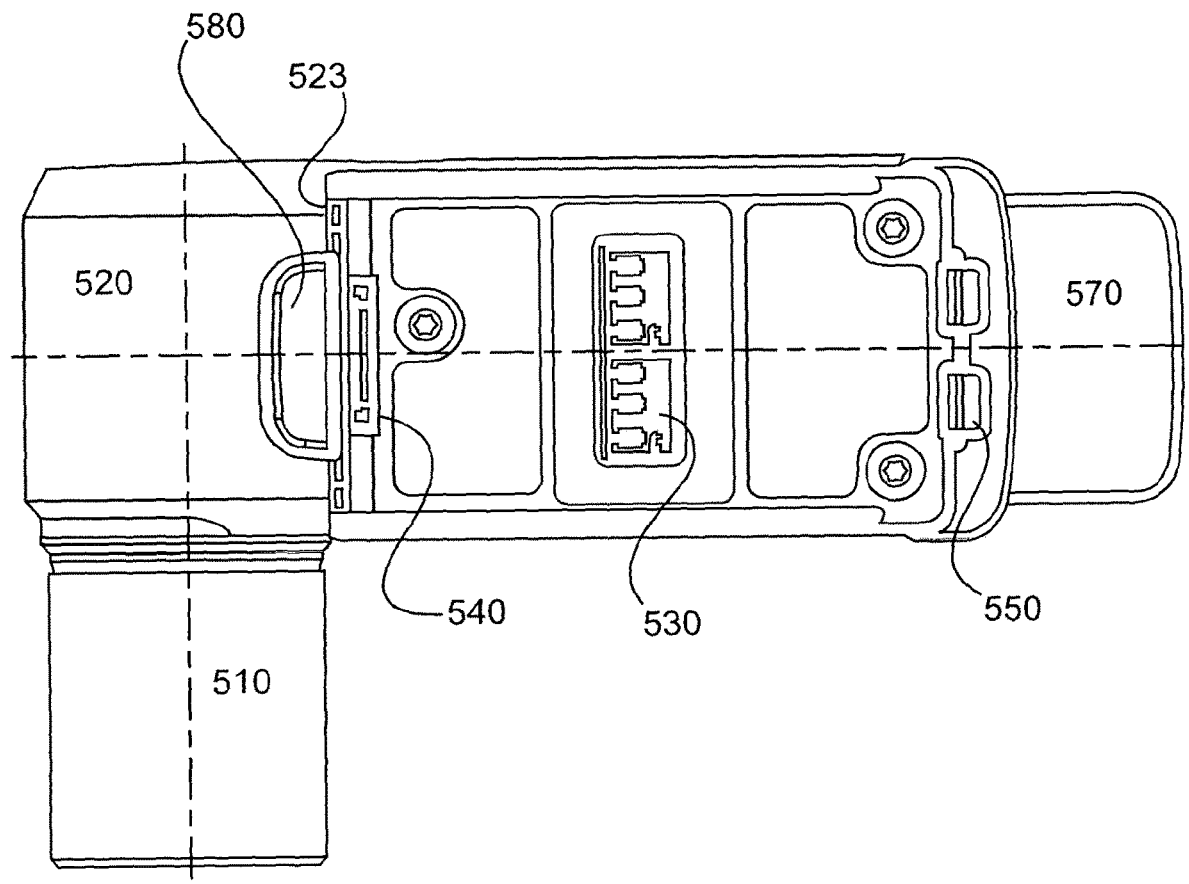
Figure 1D:
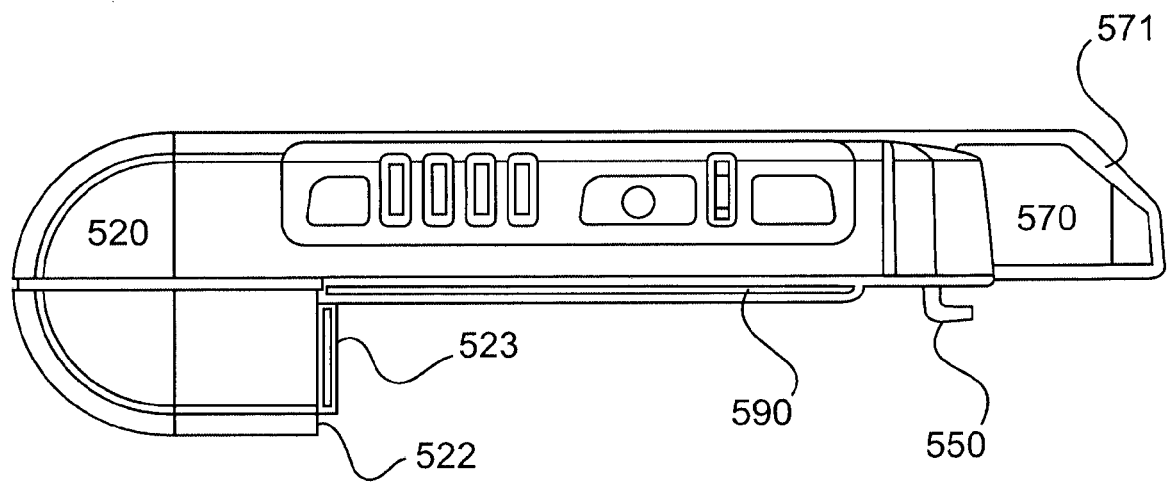
Figure 1E:
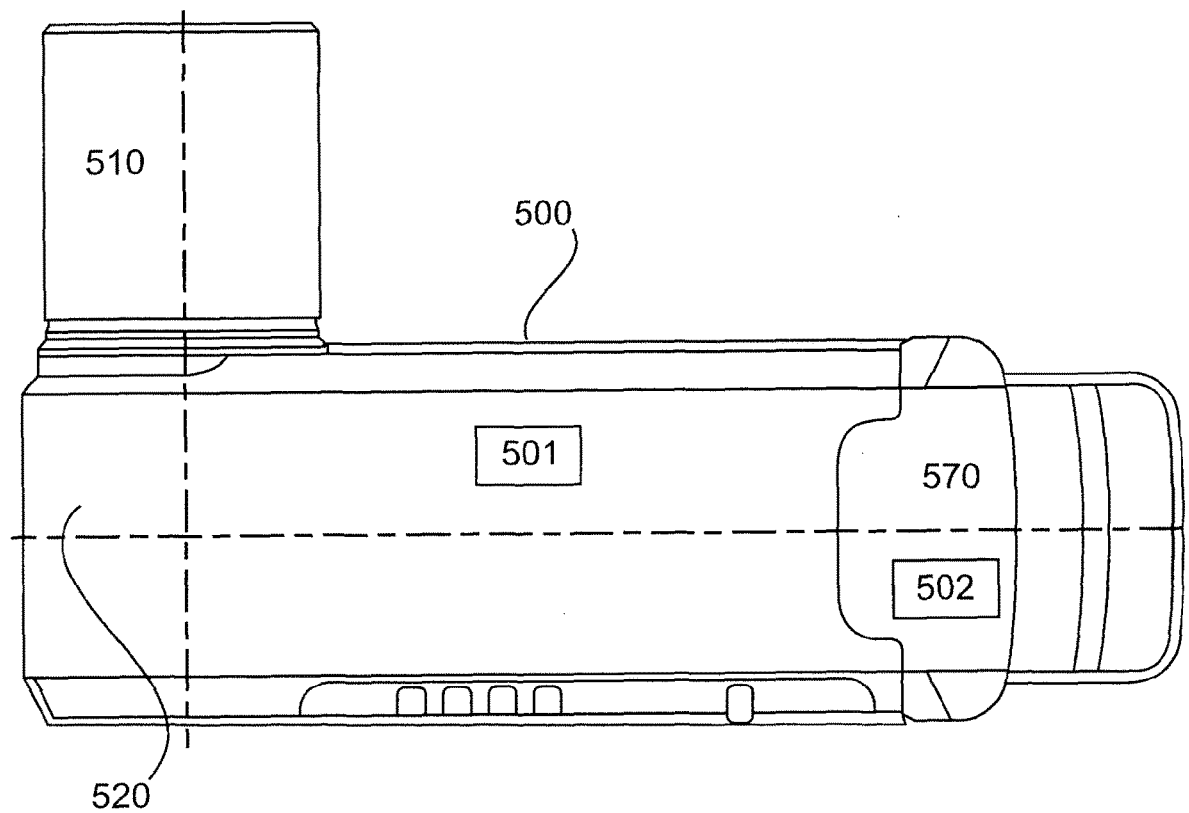
Figure 1F:
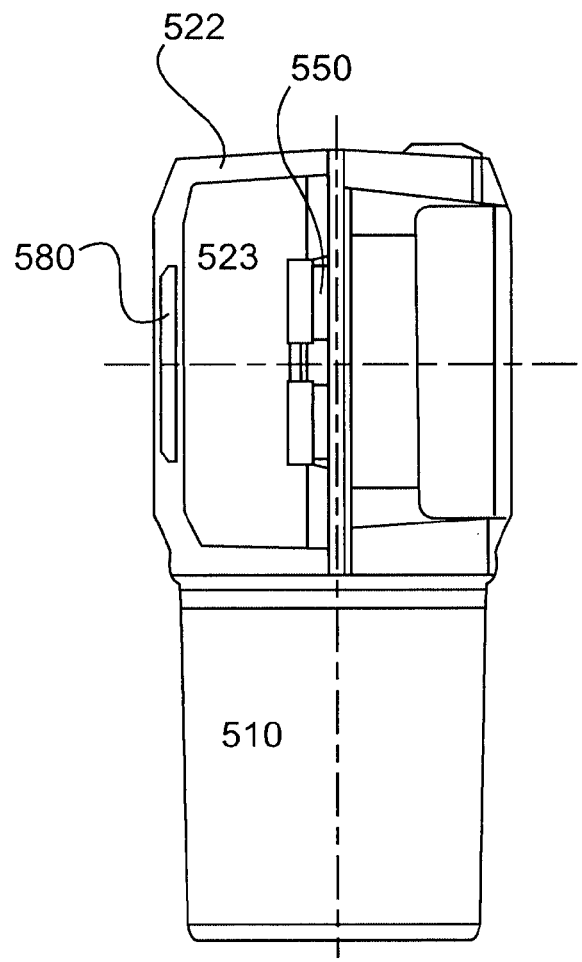
Figure 1G:
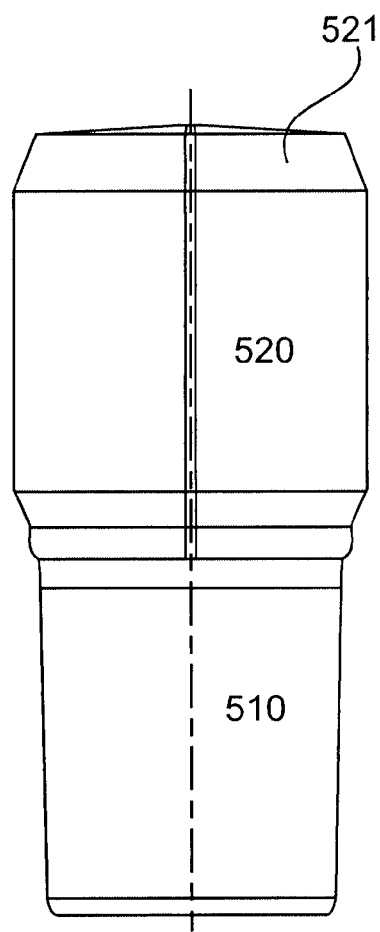

FIGS. 1A-1G show various views of a (wireless) camera receiver according to a first embodiment. The high frequency receiver 500 has a rechargeable battery 600. The high frequency receiver 500 has an XLR plug 510 which is adapted to be rotatable, that is to say the remainder of the housing of the receiver is rotatable when the XLR plug 510 can be fixed in an XLR socket for example on a video camera. The receiver has a first end 570 with a bevel 571 and a second end 520 with a bevel 521. Two hooks 550 are provided on the inside 570a of the end 570. In addition there are six electrical connections 530, 531-536 which optionally can be of a spring-mounted nature. In addition there is a (fixing) element 540 which can cooperate with an element 640 of the rechargeable battery 600 to securely fix the end of the rechargeable battery 600. In addition there is a release mechanism 580 which cooperates with the hook 540 in order to lift the hook 540 out of the element 640 so that the rechargeable battery can be removed.

The camera receiver 500 can have a high frequency receiver unit 501 for wirelessly receiving a high frequency signal. That can be effected for example by way of an antenna 502 in or at the first end 570. The received audio signal can be output by way of the XLR plug 510.

Provided on the inside of the HF receiver are two guides 590 which can cooperate with the grooves 690 of the rechargeable battery 600. The guides 590 extend substantially to the height of the hooks 540. The grooves 690 extend substantially along the length of the rechargeable battery.

The second end 520 has an inside wall 523 with an at least partially peripherally extending recess 522. The inside wall 523 is perpendicular to the inside 570a.

Figure 2A:
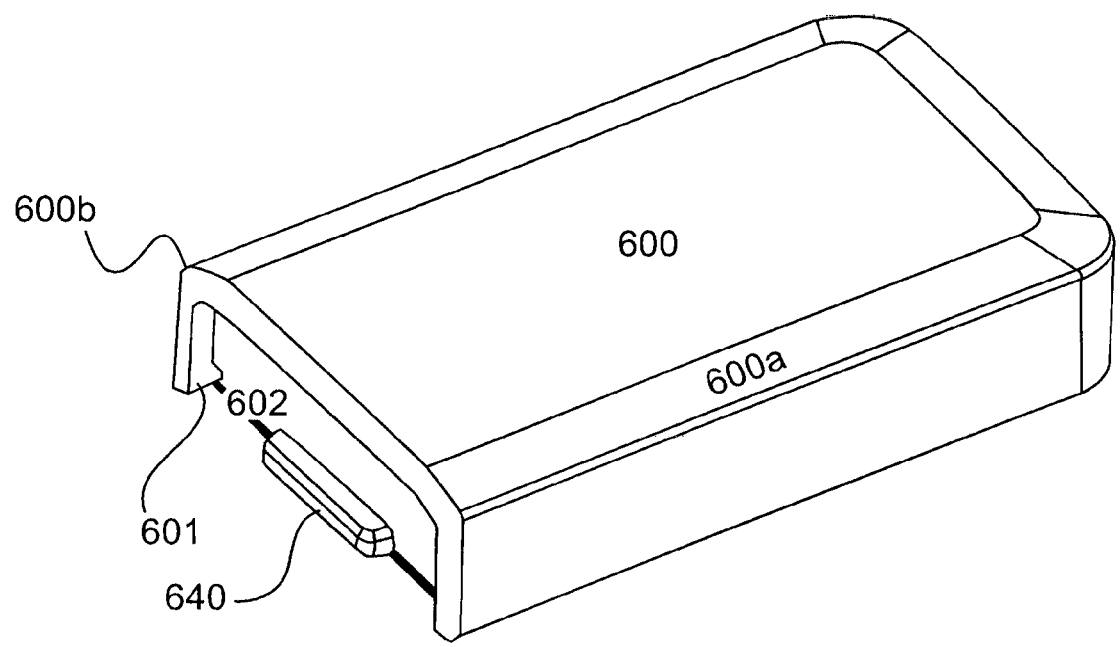
Figure 2B:
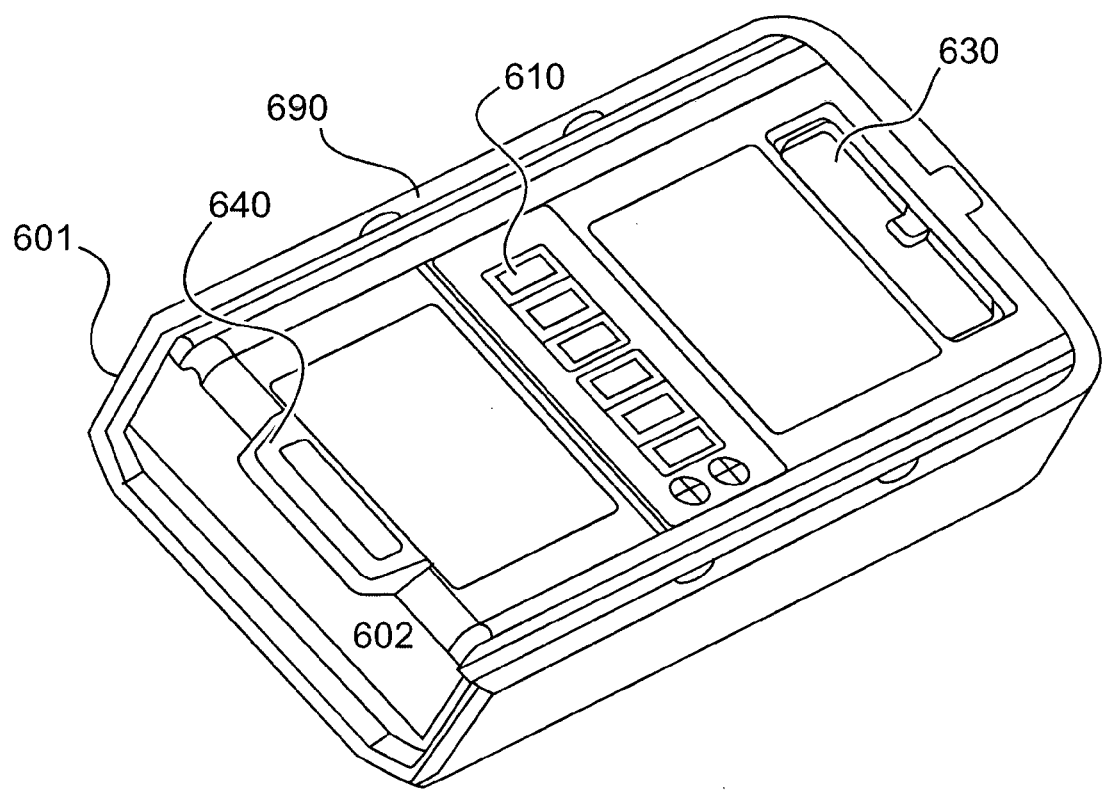
Figure 2C:
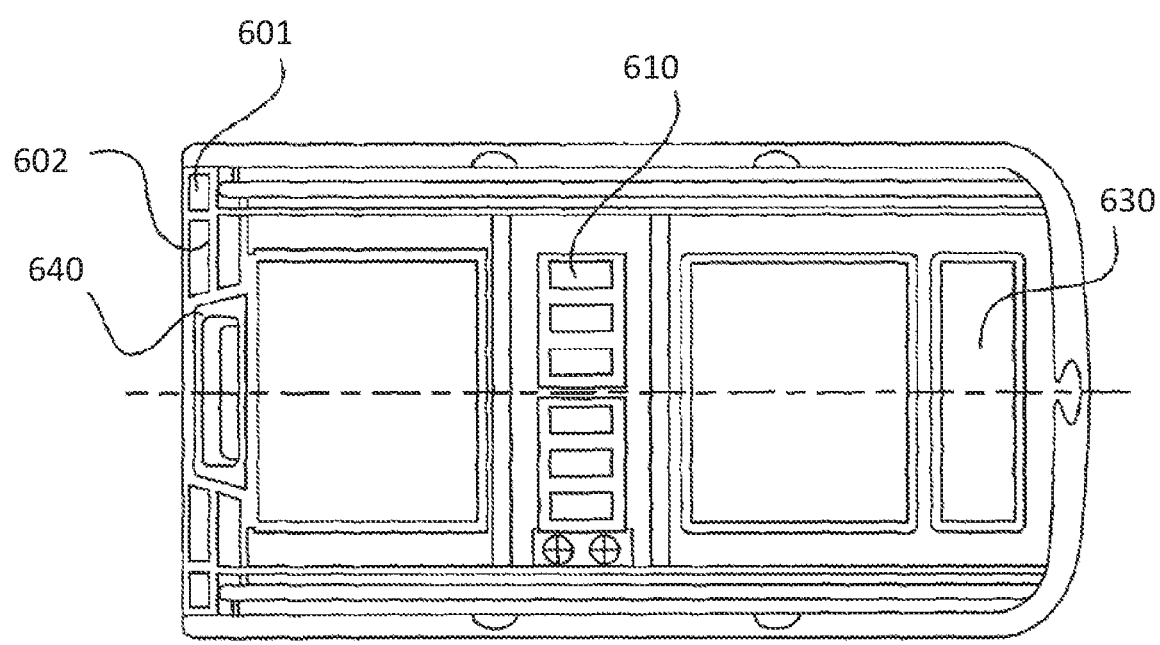

FIGS. 2A-2E show various views of a rechargeable battery unit for the camera receiver according to the first embodiment.

On its outside the rechargeable battery 600 has a bevel 600a extending along three sides of the outside of the rechargeable battery 600. At its one elastic end the rechargeable battery has a USB connection (in particular a micro-USB connection) 620 with a cover 621. There can also be a notification LED 622. The cover 621 is preferably made of rubber or another plastic and closes the USB-jack/connection 620.

Provided on the inside of the rechargeable battery are the two grooves 690, the six electrical connections 610 and the element 640. There is also a recess 630 which is of such a width that the hooks 550 of the camera receiver 500 can be placed therein and can engage therein when the rechargeable battery is pushed on and the closure means has been closed.

Provided at the side 600b of the rechargeable battery having the element 640 is an inside wall 602 and a projection 601 which peripherally extends at three sides. In the assembled condition the inside wall 602 bears against the wall 523 and the projection 601 is disposed in the recess 522.

The connection 510 is rotatable and can cover an angular range of between 300 and 340°. This means that 360° rotation is not possible. That can ensure that the receiver can be fitted to cameras of different structural shapes. More recent camera structures are currently becoming smaller and smaller by virtue of miniaturization of the electronics and the storage media from one model to another. The result of this is that certain camera receivers which have still fitted to the last model can no longer be fitted to the new model for mechanical reasons. The rotatability of the connection substantially excludes there not being sufficient space at the XLR connection of the camera in order to operate that camera receiver thereon.

The connection 510 is rotatable about its longitudinal axis.

A wireless camera receiver is a wireless receiver which receives a wireless audio signal from a wireless microphone or another wireless transmitter and then outputs the audio signal to the camera by way of an XLR connection. The camera can store the received audio signals together with the video signals recorded by it.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A rechargeable battery unit for a wireless camera receiver, comprising:
    two side faces, an upper face, a lower face, a front face, and a back face, wherein the two side faces, the upper face, and the lower face extend along a length of the rechargeable battery unit;
    an electrical USB charging connection configured to receive a USB charging cable; and
    six electrical connections configured to make contact with corresponding electrical connections of the wireless camera receiver;
    wherein the electrical connections are arranged on the lower face of the rechargeable battery unit; and
    grooves adapted to receive guides of the wireless camera receiver, wherein the grooves extend on the two side surfaces and substantially along the length of the rechargeable battery unit;
    wherein the back face has an inside wall, a fixing element, and projections that extend from the back face on three edges of the inside wall, the projections being formed by the two side faces and the upper face respectively,
    wherein the fixing element is located on a fourth edge of the inside wall different from said three edges, and wherein the fixing element is adapted for securely fixing the rechargeable battery unit to a hook of the camera receiver.

2. A method comprising:
    utilizing the rechargeable battery unit as set forth in claim 1 in a wireless camera receiver for wirelessly receiving an audio signal, the camera receiver being mountable on a camera.

3. The method according to claim 2;
    wherein the wireless camera receiver comprises:
        a housing;
        a wireless receiving unit configured to receive a wirelessly transmitted audio signal; and
        an XLR connector configured to output of a wirelessly received audio signal, the XLR connector being rotatable with respect to the housing.

4. The rechargeable battery unit as set forth in claim 1;
    wherein the inside wall further has a fourth edge from which the projection does not peripherally extend, and
    wherein said element for securely fixing the rechargeable battery unit to the hook of the camera receiver is located at said fourth side of the inside wall.

5. The rechargeable battery unit as set forth in claim 1;
    wherein said side of the rechargeable battery unit is a first short side of the rechargeable battery unit, and
    wherein the battery unit further has a second short side parallel to said first short side, and
    wherein said electrical connections arranged on the inside of the rechargeable battery unit are arranged side-to-side in a row that spans between said grooves.

6. A rechargeable battery unit for a wireless camera receiver, the rechargeable battery unit comprising:
    an upper face and a lower face,
    a left side and a right side being perpendicular to the upper face and lower face, and
    a front side and a back side being perpendicular to the upper face, lower face, left side and right side,
    wherein the upper face, lower face, left side and right side extend along a length of the rechargeable battery unit, and
    wherein two edges of the lower face are surrounded by first projections formed by the left side and the right side respectively, wherein an inside of the first projections is directed towards the lower face and wherein grooves extend along the inside of the first projections, the grooves being adapted to receive guides of the wireless camera receiver, and
    wherein three edges of the front side are surrounded by second projections formed by the left side, the right side and the upper face respectively,
    the rechargeable battery unit comprising:
        an electrical USB charging connection configured to receive a USB charging cable;
        on the lower face, six electrical connections configured to make contact with corresponding electrical connections of the wireless camera receiver, and a recess configured for fixing the rechargeable battery unit on hooks of the wireless camera receiver; and
        wherein a fixing element is located on the front side at an edge not surrounded by the second projections and adjacent to the lower face.

7. The rechargeable battery unit as set forth in claim 6;
    wherein, on the lower face, the electrical connections are located substantially at the center of the length and the recess is located near the back side.

8. The rechargeable battery unit as set forth in claim 6;
    wherein the second projections project beyond the front side by substantially the same length as the fixing element.

* * * * *